United States Patent
Yang

(10) Patent No.: US 10,083,198 B2
(45) Date of Patent: Sep. 25, 2018

(54) METHOD AND APPARATUS FOR INTER-DATABASES DATA UPDATING

(71) Applicant: Alibaba Group Holding Limited, George Town, Grand Cayman (KY)

(72) Inventor: Xianghe Yang, Hangzhou (CN)

(73) Assignee: Alibaba Group Holding Limited, Grand Cayman (KY)

(*) Notice: Subject to any disclaimer, the term of this patent is extended or adjusted under 35 U.S.C. 154(b) by 255 days.

(21) Appl. No.: 14/958,729

(22) Filed: Dec. 3, 2015

(65) Prior Publication Data

US 2016/0162530 A1    Jun. 9, 2016

(30) Foreign Application Priority Data

Dec. 4, 2014   (CN) .......................... 2014 1 0738207

(51) Int. Cl.
*G06F 17/00* (2006.01)
*G06F 17/30* (2006.01)

(52) U.S. Cl.
CPC .. *G06F 17/30345* (2013.01); *G06F 17/30339* (2013.01); *G06F 17/30575* (2013.01)

(58) Field of Classification Search
CPC ......... G06F 17/30315; G06F 17/30575; G06F 17/18; G06F 17/30371; G06F 17/30584
See application file for complete search history.

(56) References Cited

U.S. PATENT DOCUMENTS

| | | | |
|---|---|---|---|
| 5,832,519 A | 11/1998 | Bowen et al. |
| 6,952,692 B1 | 10/2005 | Bhattiprolu et al. |
| 7,013,311 B2 | 3/2006 | Hui et al. |
| 7,127,462 B2 | 10/2006 | Hiraga et al. |
| 7,203,712 B2 | 4/2007 | Adiba et al. |
| 7,281,023 B2 | 10/2007 | Lous |
| 7,281,024 B1 | 10/2007 | Banerjee et al. |
| 7,409,401 B2 | 8/2008 | Hansen et al. |
| 7,734,581 B2 | 6/2010 | Gu et al. |
| 7,831,618 B2 | 11/2010 | Hiraga et al. |
| 7,974,981 B2 | 7/2011 | Zhao et al. |
| 8,054,764 B2 | 11/2011 | Eshwar |
| 8,139,598 B2 | 3/2012 | Holmstrom et al. |
| 8,417,669 B2 | 4/2013 | Xu et al. |

(Continued)

Primary Examiner — Truong Vo

(57) ABSTRACT

The present disclosure relates to the field of data processing, disclosing a method and apparatus of inter-databases data updating. A method of inter-databases data updating of the present disclosure includes the steps of generating a third row of data based on data of a first database, where data of at least one column of the third row of data is a no-operation operator, the no-operation operator indicating no data change; and updating a fourth row of data of a second database based on the third row of data, where no-operation operator columns of data of the third row of data are not utilized to update data of corresponding columns of the fourth row of data, non no-operation operator columns of data of the third row of data are utilized to update data of corresponding columns of the fourth row of data. When there is only data change at some columns of a row of data, only data of the columns where data has changed will be updated, decreasing the amount of data to be updated, increasing the updating efficiency of databases, and reducing the waste of resources and time.

21 Claims, 2 Drawing Sheets

(56) References Cited

U.S. PATENT DOCUMENTS

| | | |
|---|---|---|
| 8,463,818 B2 | 6/2013 | Bender |
| 8,495,085 B2 | 7/2013 | Cai et al. |
| 8,666,985 B2 | 3/2014 | Finnie et al. |
| 8,903,122 B2 | 12/2014 | Cansancio et al. |
| 8,909,681 B2 | 12/2014 | Spalten |
| 8,930,397 B2 | 1/2015 | Rambo et al. |
| 9,047,331 B2 | 6/2015 | Rao et al. |
| 9,071,654 B2 | 6/2015 | Hunter |
| 9,075,831 B2 | 7/2015 | Wong |
| 9,110,961 B2 | 8/2015 | Bender |
| 9,128,974 B2 | 9/2015 | Konagolli Suresh et al. |
| 9,251,214 B2 | 2/2016 | Diaconu et al. |
| 2003/0055828 A1 | 3/2003 | Koch et al. |
| 2004/0199552 A1 | 10/2004 | Ward et al. |
| 2006/0235852 A1 | 10/2006 | Gaug |
| 2007/0040094 A1 | 2/2007 | Smith et al. |
| 2008/0133543 A1 | 6/2008 | Fu et al. |
| 2008/0270368 A1 | 10/2008 | Cotner et al. |
| 2009/0240663 A1 | 9/2009 | Plattner et al. |
| 2010/0005124 A1* | 1/2010 | Wagner ............ G06F 17/30575 707/E17.005 |
| 2011/0137546 A1 | 6/2011 | Roesser et al. |
| 2012/0095974 A1 | 4/2012 | Bentkofsky et al. |
| 2012/0173406 A1 | 7/2012 | Fei et al. |
| 2013/0024422 A1 | 1/2013 | Konagolli et al. |
| 2014/0279899 A1 | 9/2014 | Gu et al. |

* cited by examiner

METHOD AND APPARATUS FOR INTER-DATABASES DATA UPDATING

CROSS REFERENCE TO RELATED APPLICATION

This application claims the benefits to Chinese Patent Application No. 201410738207.9, filed on Dec. 4, 2014, which is incorporated herein by reference in its entireties.

TECHNICAL FIELD

The present invention relates generally to data processing, and more particularly to the technologies of inter-databases data updating.

BACKGROUND

For those on-line databases updated based upon the unit of line or row, if a row of data incurs a slight amount of change at its respective columns, the entire row of data will be updated upon data updating. It generates a vast impact on the databases, which have a large number of rows of data and require updates of many of its rows within a short period of time. E-commerce customer service related on-line databases are such type of databases as they tend to need updating almost every instant, with a row worth of data containing several megabyte or tens of megabytes of data. Consequently, such data updating is both time consuming and resource wasting. Furthermore, upon unsuccessful data importation into databases, splitting of groups will be resorted to, which also leads to the waste of effort and resources.

SUMMARY

According to one perspective of the present invention, there is provided a method and apparatus for inter-databases data updating. When there is data change at only some columns of a row of data, only the data of the columns where data have changed will be updated, decreasing the amount of data to be updated, increasing database updating efficiency, and reducing the waste of time and resources.

According to an exemplary embodiment of the present disclosure, a method of inter-database data updating includes the step of generating a third row of data based on data of a first database, where data of at least one column of the third row of data is a no-operation operator, the no-operation operator indicating no data change. The method also includes the step of updating a fourth row of data of a second database based on the third row of data, where the no-operation operator columns of data of the third row of data are not utilized to update data of corresponding columns of the fourth row of data, while the non no-operation operator columns of data of the third row of data are utilized to update data of corresponding columns of the fourth row of data.

According to another exemplary embodiment of the present disclosure, an apparatus for inter-databases data updating includes a generating module configured for generating a third row of data based on data of a first database, where data of at least one column of the third row of data is a no-operation operator, the no-operation operator indicating no data change. The apparatus also includes a updating module configured for updating a fourth row of data of a second database based on the third row of data, where the no-operation operator columns of data of the third row of data are not utilized to update data of corresponding columns of the fourth row of data, while the non no-operation operator columns of data of the third row of data are utilized to update data of corresponding columns of the fourth row of data.

According to at least one embodiment of the present disclosure, when there is data change at only some columns of a row of data, there is no need to update the entire row of data of the database, only the data of columns where data change has occurred are update using no-operation operators such that the amount of data updating can be reduced. Especially when a row in a database has a large amount of data, it effectively increases the updating efficiency for the database, and reduces the waste of time and resource. Further, upon unsuccessful importation of data, there is no need to import the entire row of data, but to update the data of columns corresponding to the no-operation operators, further reducing the waste of resources.

Further, with applications in the Internet, databases such as e-commerce platforms' on-line databases have heightened demands in terms of real time data updating. If the amount of data to be updated is huge, such real time demands cannot be met. However, using no-operation operators to update only data of the columns where data change has occurred in a row, the efficiency of updating such on-line databases can be effectively enhanced.

Furthermore, using SQL statements to import rows of data to be updated (i.e., the third row of data) into a database, when data change is at different columns in different rows, it is unnecessary to reparse the SQL statements for different rows. Instead, the entire rows of data can be directly imported into the database, decreasing costs associated with the SQL hard parsing and increasing updating efficiency for the database.

The details of one or more embodiments of the disclosure are set forth in the accompanying drawings and the description below. Other features, objects, and advantages of the disclosure will be apparent from the description and drawings, and from the claims.

DESCRIPTION OF THE DRAWINGS

The accompanying drawings, which are incorporated in and form a part of this specification and in which like numerals depict like elements, illustrate embodiments of the present disclosure and, together with the description, serve to explain the principles of the disclosure.

DETAILED DESCRIPTION

In the following description, numerous specific details are set forth in order to provide a thorough understanding of the present disclosure. However, it will become obvious to those skilled in the art that the present disclosure may be practiced without these specific details. The descriptions and representations herein are the common means used by those experienced or skilled in the art to most effectively convey the substance of their work to others skilled in the art. In other instances, well-known methods, procedures, components, and circuitry have not been described in detail to avoid unnecessarily obscuring aspects of the present disclosure.

Reference herein to "one embodiment" or "an embodiment" means that a particular feature, structure, or characteristic described in connection with the embodiment can be included in at least one embodiment of the disclosure. The appearances of the phrase "in one embodiment" in various places in the specification are not necessarily all referring to the same embodiment, nor are separate or alternative embodiments mutually exclusive of other embodiments. Used herein, the terms "upper", "lower", "top", "bottom", "middle", "upwards", and "downwards" are intended to provide relative positions for the purposes of description, and are not intended to designate an absolute frame of reference. Further, the order of blocks in process flowcharts or diagrams representing one or more embodiments of the disclosure do not inherently indicate any particular order nor imply any limitations in the disclosure.

Figure 1:
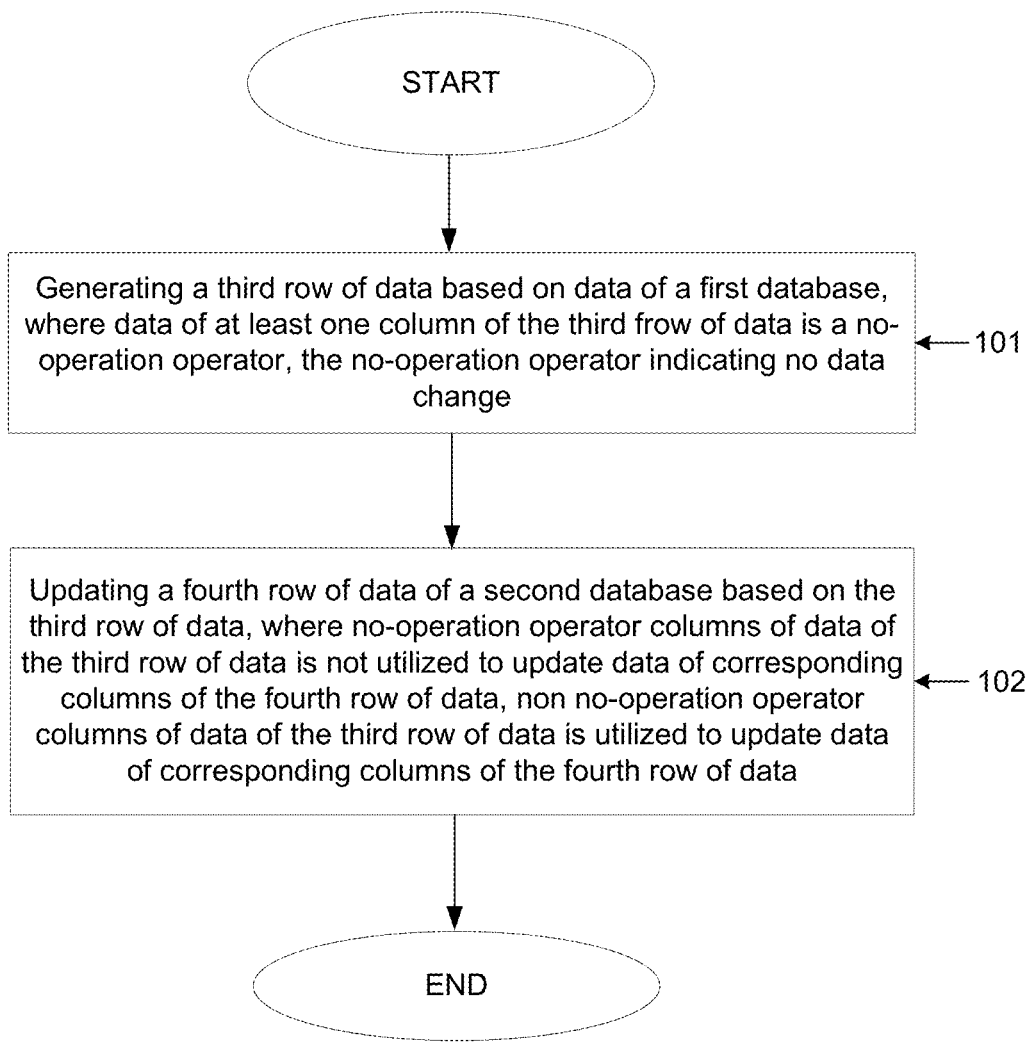
FIG. 1 is a flow chart of an exemplary method of inter-databases data updating in accordance with a first embodiment of the present disclosure.
Figure 2:
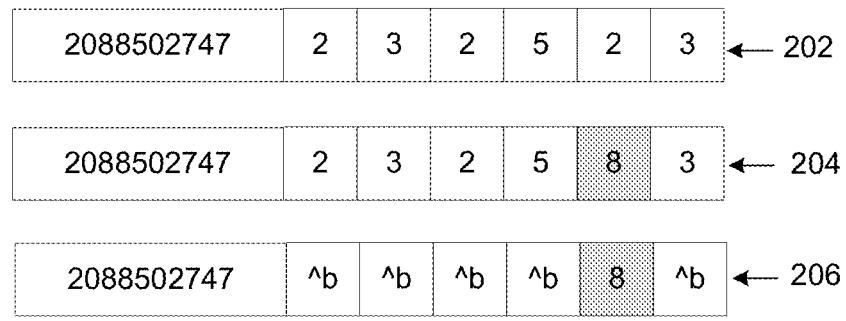
FIG. 2 illustrates exemplary data updating between databases over change of transaction data in accordance with a preferred embodiment of the present disclosure.
Figure 3:
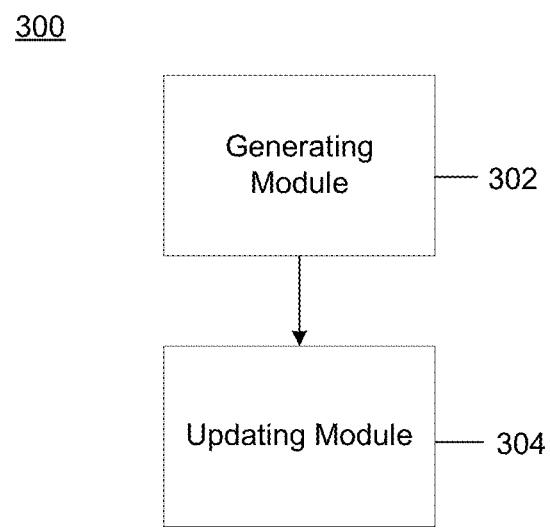
FIG. 3 is a block diagram of an apparatus of inter-databases data updating in accordance with a third embodiment of the present disclosure.

Embodiments of the present disclosure are discussed herein with reference to FIGS. 1-3. However, those skilled in the art will readily appreciate that the detailed description given herein with respect to these figures is for explanatory purposes as the disclosure extends beyond these limited embodiments.

Referring to FIG. 1, a flow chart of an exemplary method of inter-databases data updating in shown in accordance with a first embodiment of the present disclosure. "Inter-databases" data updating is defined herein as data updating or data synchronization between databases or amongst databases. The method 100 starts at step 101, where a third row of data is generated based on data of a first database. The third row of data (hereinafter, the third row or the third row of data) has at least one column of data as a no-operation operator, which indicates there is no data change. Then, in step 102, a fourth row of data (hereinafter, the fourth row or the fourth row of data) of a second database is updated based the third row of data. Data of the no-operation operator columns of the third row are not utilized to update data of corresponding columns of the fourth row. In contrast, data of the non no-operation operator columns of the third row are utilized to update data of corresponding columns of the fourth row.

In the above described updating method, when data of a column have a value of a no-operation operator, updating based on that data will be skipped, i.e., no updating of the data of the corresponding column. In other words, when updating the fourth row of data of an on-line database based on the third row of data, if data at columns of the third row are no-operation operators, updating of the data at the corresponding columns in the fourth row will be skipped. Only when data at columns of the third row are non no-operation operators, data at the corresponding columns in the fourth row will be updated based on such data of the third row accordingly. The method 100 concludes after step 102.

Structure Query Language (SQL) statements can be utilized by embodiments of the present disclosure to accomplish the updating of the on-line databases. Alternatively, Application Programming Interface (API) functions can also be utilized to accomplish the updating of the on-line databases.

In a preferred embodiment of the present disclosure, the above described step 102 includes the step of utilizing SQL UPDATE statements (the standard statement for modifying data of a table) to update the fourth row of data based on the entire third row of data. Although only data of columns corresponding to non no-operation operators are to be updated, SQL UPDATE statements can specify parameters such that to indicate updating every column correspondent to the third row. For example, with a table entitled "student" as the first database (with 10 columns labeled as A, B, C, D, E, F, G, H, I and J respectively), when the nth row of data having a value of (2, 4, 6, 2, 9, 8, 7, 3, 4, 1) changes into a value of (2, 4, 10, 2, 9, 8, 15, 3, 4, 1), only the data of the 3rd and 7th columns have changed. Accordingly, the third row of data generated has a value of (^b, ^b, 10, ^b, ^b, ^b, 15, ^b, ^b, ^b), where ^b represents a no-operation operator. Then, SQL UPDATE statements are utilized to update the fourth row of data of the second database, where the UPDATE statements are specified to update every column of the data (i.e., UPDATE statements specify parameters including the identifiers of all the columns of the third row of data). However, due to the temporary skipping of updating data at columns having values of no-operation operators during the update, only the 3rd and the 7th columns of data of the fourth row will be updated, data at other columns remaining the same.

With a present technique, SQL UPDATE statements can be used to update only some of the columns by specifying parameters for those particular columns. If every row of data in a data table to be updated has different columns of data that needs updating, every row of data needs a corresponding SQL UPDATE statement, which needs parsing before execution and, consequently, results in a large work load of SQL parsing.

With another present technique, in order to reduce the amount of SQL parsing, UPDATE statements can be implemented to include parameters for all the columns. However, such technique leads to updating data of columns where there is no data change. Although only one SQL parsing is needed, the work load of executing the UPDATE statements remains huge.

Therefore, it can be seen that an artisan with ordinary skills of the art in the field faces a dilemma of how to reduce the amount of SQL parsing and, at the same time, to reduce the amount of UPDATE statement execution, which is also a challenge.

In accordance with embodiments of the present disclosure, using SQL to import rows of data to be updated (i.e., the third row of data) into databases, with the hope to update only data of columns where there is data change, and with a UPDATE statement including parameters for identifiers of all the columns of the third row of data (i.e., update all the columns), the UPDATE statement only needs to be parsed once in order to update all the rows, regardless that in fact every row needs to update data at different columns. Thus, there is no need of reparsing SQL statements, reducing costs associated with the SQL hard parsing and increasing database updating efficiency. At the same time, through the use of no-operation operators and corresponding processing steps, data of columns where there is no data update will be skipped during the execution of SQL statements, therefore the work load of executing SQL UPDATE statements is far less than that associated with the present techniques.

In another embodiment of the present disclosure, the above described step 102 includes the step of utilizing the on-line database' corresponding API functions to update the fourth row of data based on the entire third row of data.

When there is only data change at some columns of a row of data, there is no need to update the entire row of data of the database. Therefore, only data of columns where data change has occurred is updated using no-operation operators such that the amount of data updating can be reduced.

Especially for a row having a large amount of data, database updating efficiency can be effectively increased, and the waste of time and resource can be reduced. Further, upon unsuccessful importation of data, there is no need to import the entire row of data, only to update data of columns corresponding to the no-operation operators, further reducing the waste of resources.

The second embodiment of the present disclosure relates to a method of inter-databases data updating. The second embodiment improves upon the first embodiment, with the primary improvement being that the first database is an off-line database, the second database an on-line database. With some web applications, for example, e-commerce platforms' on-line databases have heightened demands in terms of real time data updating. If the amount of data to be updated is too large, then such demands cannot be met. Using no-operation operators to update only data of columns where data change has occurred in a row of data, the updating efficiency of on-line databases can be enhanced.

Particularly, the above described step 101 includes the steps of the off-line database receiving data from the on-line database. The step 101 further includes the step of the off-line database performing statistical analysis on the received data such as to generate a first row of data (hereinafter first row or first row of data) based on the result of the statistical analysis. The step 101 also includes the step of comparing the first row of data with the second row of data of the off-line database such that data of columns where data of the first row and data of the second row of data is compared as the same are converted into no-operation operator; and data of columns where data of the first row of data and data of the second row of data is compared as different are saved to generate the third row of data. The first, second, third, and fourth rows of data have the same number of columns with the same definitions. The second row of data, representing the state of the fourth row of data prior to present updating, is a backup of the fourth row of data saved by the off-line database after its last time updating of the on-line database' fourth row of data.

Further, it can be understood that, in accordance with some other alternative embodiments of the present disclosure, other implementations can be utilized to generate the third row of data. For example, in the above described steps, with data of all the columns of the second row of data being implemented as no-operation operators, API functions can be utilized to read data from the first row of data and to write the data having changes into the second row of data such that to generate the third row of data.

The method of inter-databases data updating of the present disclosure can be applied to data updating amongst multiple types of databases. For example, in another embodiment of the present disclosure, the above described on-line database and off-line database are databases of bank account holders' basic behavior data and loaning behavior data. The basic behavior data can include data such as a shopping website account user's age, gender, birth date, level of the account, etc. Loaning behavior data can include data such as a shopping website account user's current balance of the account, the number of transactions, the number of transfers between the accounts, the amounts of transfers, the amounts of transactions, the number of complaints, the level of shopping activities, etc. The following exemplary implementation further describes the data updating method in accordance with embodiments of the present disclosure.

Referring now to FIG. 2, after an off-line database receives information that a user of an on-line database has incurred in changes in transaction data, the off-line database performs statistical analysis upon the received transaction data to generate a first row of data. For example, based on the change in the amounts of user transactions, the off-line database will statistically analyze the user's total transaction amounts within the past one month or the past one week, and determine whether the total transaction amount has reached the level that qualifies the user to be upgraded to an upgraded user account. If so, the off-line database updates user's level of the account data in the basic behavior data, for example, updates the data of the sixth column. Then, the off-line database compares the first row of data 202 to the second row of data 204 such that to generate a third row of data 206, where ^b represents a no-operation operator. Due the fact that only data of the sixth column has changed, the generated third row of data only has the sixth column data as non no-operation operator. Consequently, when updating the fourth row of data, only the data of the sixth column will be updated.

Embodiments of the present disclosure can be implemented using software, hardware, firmware, and/or the combinations thereof. Regardless of being implemented using software, hardware, firmware or the combinations thereof, instruction code can be stored in any kind of computer readable media (for example, permanent or modifiable, volatile or non-volatile, solid or non-solid, fixed or changeable medium, etc.). Similarly, such medium can be implemented using, for example, programmable array logic (PAL), random access memory (RAM), programmable read only memory (PROM), read only memory (ROM), electrically erasable programmable ROM (EEPROM), magnetic storage, optical storage, digital versatile disc (DVD), or the like.

Referring to FIG. 3, a block diagram of an exemplary apparatus for inter-databases data updating in accordance with a third embodiment of the present disclosure is shown. The apparatus 300 includes a generating module 302 and an updating module 304. The generating module 302 is configured for generating a third row of data based on data of a first database, data of at least one column of the third row of data is a no-operation operator, the no-operation operator indicating no data change. The updating module 304 is configured for updating a fourth row of data of a second database based on the third row of data, where no-operation operator columns of data of the third row of data are not utilized to update data of corresponding columns of the fourth row of data, non no-operation operator columns of data of the third row of data are utilized to update data of corresponding columns of the fourth row of data.

In a preferred embodiment of the present disclosure, the above described updating module includes a language updating sub-module, which is configured for, by use of Structured Query Language (SQL) UPDATE statements, updating the fourth row of data based on the entire third row of data.

In another preferred embodiment of the present disclosure, the above described updating module includes a function updating sub-module, which is configured for, by use of Application Programming Interface (API) functions of the on-line database, updating the fourth row of data based on the entire third row of data.

The first embodiment corresponds to the instant embodiment of the present disclosure, the instant embodiment can be implemented in cooperation with the first embodiment. The technical details described in the first embodiment apply to the instant embodiment, and are not repeated herein for the purposes of reducing repetition. Accordingly, the technical details described in the instant embodiment apply to the first embodiment.

The fourth embodiment of the present disclosure relates to an exemplary apparatus for inter-databases data updating. The fourth embodiment improves upon the third embodiment, the primary improvement being that the first database is an off-line database and the second database is an on-line database. With some applications in the Internet, for example, e-commerce platforms' on-line databases have heightened demands in terms of real time data updating. If the amount of data to be updated is too large, then such demands cannot be met. Using no-operation operators to update only data of columns where data change has occurred in a row of data, the updating efficiency of on-line databases can be enhanced.

In particular, the above described generating module includes a receiving sub-module, a statistical sub-module, a comparison sub-module, and a replacing sub-module. The receiving sub-module is configured for the off-line database to receive data from the on-line database. The statistical sub-module is configured for the off-line database to perform statistical analysis upon the received data and to generate a first row of data based on the results of the statistical analysis. The comparison sub-module is configured for comparing the first row of data with a second row of data of the off-line database such that data of columns where data of the first row of data and data of the second row of data is compared as the same are converted into no-operation operator and data of columns where data of the first row of data and data of the second row of data is compared as different are saved to generate the third row of data. The replacing sub-module is configured for, after the comparison sub-module comparing the first row of data with a second row of data, replacing data of the second row of data with data of the first row of data for use in the next comparison.

The above described on-line database and off-line database are updated on the basis of the unit of line or row, every line or row of data including multiple columns. The first, second, third, and fourth rows of data have the same number of columns with the same definitions. The second row of data, representing the state of the fourth row of data prior to present updating, is a backup of the fourth row of data saved by the off-line database after its last time updating of the on-line database' fourth row of data.

The method of inter-databases data updating of the present disclosure can be applied to data updating amongst multiple types of databases. For example, in a preferred embodiment of the present disclosure, the above described on-line database and off-line database are databases of bank account holders' basic behavior data and loaning behavior data.

Further, it can be understood that, in accordance with other alternative embodiments of the present disclosure, the on-line database can be a database of other types of data, including but not limited to, traffic guidance database or surveillance video database.

In another embodiment of the present disclosure, the on-line and off-line databases are databases storing statistical data of transactions on an e-commerce platform. The data updating between the two databases is illustrated in the following. The statistical sub-module controls the off-line database to receive transaction data from the on-line database and to generate a first row of data. For example, with a table having 8 columns presenting categories of digital products, rice and oil, vegetables and fruits, clothing, dried goods, water products, accessories and books respectively, each row indicates the sales amount under each category in the unit of million. The first row of data in the table has a value of (15, 20, 18, 64, 31, 15, 20, 8). The comparison sub-module is configured for comparing the first row of data with the second row of data having a value of (15, 20, 18, 54, 31, 15, 18, 8) to generate a third row of data (^b, ^b, ^b, 54, ^b, ^b, 18, ^b). Then, the updating module updates the on-line database' fourth row of data having a value of (15, 20, 18, 54, 31, 15, 18, 8) into having a value of (15, 20, 18, 64, 31, 15, 20, 8), where data corresponding to columns having values as no-operation operators are not updated.

Further, in accordance with embodiments of the present disclosure, for the purposes of clear illustrations of the embodiments, exemplary databases with only limited number of columns are shown. It can be understood that, in reductions to practice, the embodiments of the present disclosure nevertheless apply to all kinds of large databases.

The second embodiment corresponds to the instant embodiment of the present disclosure, the instant embodiment can be implemented in cooperation with the second embodiment. The technical details described in the second embodiment apply to the instant embodiment, and are not repeated herein for the purposes of reducing repetition. Accordingly, the technical details described in the instant embodiment apply to the second embodiment.

It is necessary to point out that, modules or blocks described by embodiments of the present disclosures are logical modules or logical blocks. Physically, a logical module or logical block can be a physical module or a physical block, a part of a physical module or a physical block, or the combinations of more than one physical modules or physical blocks. Physical implementation of those logical module or logical blocks is not of essence. The realized functionalities realized by the modules, blocks, and the combinations thereof are key to solving the problems addressed by the present disclosure. Further, in order to disclose the novelties of the present disclosure, the above described embodiments do not disclose about those modules or blocks not too related to solving the problems addressed by the present disclosure, which does not mean that the above described embodiments cannot include other modules or blocks.

It is also necessary to point out that, in the claims and specification of the present disclosure, terms such as "first" and "second" only are for distinguishing an embodiment or an operation from another embodiment or operation. It does not require or imply that those embodiments or operations having any such real relationship or order. Further, as used herein, the terms "comprising," "including," or any other variation intended to cover a non-exclusive inclusion, such that a process, method, article, or apparatus that comprises a list of elements does not include only those elements but may include other elements not expressly listed or inherent to such process, method, article, or apparatus. Absent further limitation, elements recited by the phrase "comprising a" does not exclude a process, method, article, or apparatus that comprises such elements from including other same elements.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered as examples because many other architectures can be implemented to achieve the same functionality.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various example methods described and/or illustrated herein may also omit one or more of the steps described or illustrated herein or include additional steps in addition to those disclosed.

While various embodiments have been described and/or illustrated herein in the context of fully functional computing systems, one or more of these example embodiments may be distributed as a program product in a variety of forms, regardless of the particular type of computer-readable medium used to actually carry out the distribution. The embodiments disclosed herein may also be implemented using software modules that perform certain tasks. These software modules may include script, batch, or other executable files that may be stored on a computer-readable storage media or in a computing system. These software modules may configure a computing system to perform one or more of the example embodiments disclosed herein. One or more of the software modules disclosed herein may be implemented in a cloud computing environment. Cloud computing environments may provide various services and applications via the Internet. These cloud-based services (e.g., software as a service, platform as a service, infrastructure as a service, etc.) may be accessible through a Web browser or other remote interface. Various functions described herein may be provided through a remote desktop environment or any other cloud-based computing environment.

Although the present disclosure and its advantages have been described in detail, it should be understood that various changes substitutions, and alterations can be made herein without departing from the spirit and scope of the disclosure as defined by the appended claims. Many modifications and variations are possible in view of the above teachings. The embodiments were chosen and described in order to best explain the principles of the disclosure and its practical applications, to thereby enable others skilled in the art to best utilize the disclosure and various embodiments with various modifications as may be suited to the particular use contemplated.

Moreover, the scope of the present application is not intended to be limited to the particular embodiments of the process, machine, manufacture, composition of matter, means, methods and steps described in the specification. As one of ordinary skill in the art will readily appreciate from the disclosure of the present disclosure, processes, machines, manufacture, compositions of matter, means, methods, or steps, presently existing or later to be developed, that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

Embodiments according to the present disclosure are thus described. While the present disclosure has been described in particular embodiments, it should be appreciated that the disclosure should not be construed as limited by such embodiments, but rather construed according to the below claims.

What is claimed is:

1. An inter-database update method comprising:
storing a database row of data in a first database, a second database, and a third database, the database row of data having a plurality of data entries at a plurality of columns;
changing one or more data entries in the database row of data stored in the first database to generate a changed row of data stored in the first database, the changed row of data having a plurality of data entries at a plurality of columns;
comparing the changed row of data to the database row of data stored in the third database to generate a compared row of data, the compared row of data having a plurality of columns, each column of the compared row of data having a data entry that indicates whether a data entry in a corresponding column of the changed row of data and a data entry in a corresponding column of the database row of data stored in the third database are different; and
in each column of the database row of data stored in the second database, updating a data entry in a column to match a data entry in a corresponding column in the changed row of data only when a data entry in a corresponding column of the compared row of data indicates a difference.

2. The method of claim 1, wherein the first database is an off-line database, and the second database is an on-line database.

3. The method of claim 2, wherein generating the changed row of data includes:
receiving data by the off-line database from the on-line database; and
performing statistical analysis on the received data by the off-line database, the changed row of data being generated based on results of the statistical analysis.

4. The method of claim 1, wherein a data entry in a first column of the compared row of data having a first flag when a data entry in a first column of the changed row of data and a data entry in a first column of the database row of data stored in the third database match, and a second flag when the data entry in the first column of the changed row of data and the data entry in the first column of the database row of data stored in the third database are different.

5. The method of claim 1, wherein the database row of data stored in the second database is updated using Structured Query Language (SQL) UPDATE statements, updating the database row of data stored in the second database based on entirety of the compared row of data.

6. The method of claim 1, wherein the database row of data stored in the second database is updated using Application Programming Interface (API) functions of an on-line database, updating the database row of data stored in the second database based on entirety of the compared row of data.

7. The method of claim 4, wherein a data entry in the first column of the database row of data stored in the second database is updated to match the data entry in the first column of the changed row of data only when the data entry in the first column of the compared row of data has the second flag.

8. An inter-database update apparatus comprising:
a memory; and
a processor coupled to the memory, the processor to:

store a database row of data in a first database, a second database, and a third database, the database row of data having a plurality of data entries at a plurality of columns;

change one or more data entries in the database row of data stored in the first database to generate a changed row of data stored in the first database, the changed row of data having a plurality of data entries at a plurality of columns;

comparing the changed row of data to the database row of data stored in the third database to generate a compared row of data, the compared row of data having a plurality of columns, each column of the compared row of data having a data entry that indicates whether a data entry in a corresponding column of the changed row of data and a data entry in a corresponding column of the database row of data stored in the third database are different; and in each column of the database row of data stored in the second database, updating a data entry in a column to match a data entry in a corresponding column in the changed row of data only when a data entry in a corresponding column of the compared row of data indicates a difference.

9. The apparatus of claim 8, wherein the first database is an off-line database, and the second database is an on-line database.

10. The apparatus of claim 9, wherein the processor to generate the changed row of data by:
receiving data by the off-line database from the on-line database; and
performing statistical analysis on the received data by the off-line database, the changed row of data being generated based on results of the statistical analysis.

11. The apparatus of claim 8, wherein a data entry in a first column in the compared row of data having a first flag when a data entry in a first column of the changed row of data and a data entry in a first column of the database row of data stored in the third database match, and a second flag when the data entry in the first column of the changed row of data and the data entry in the first column of the database row of data stored in the third database are different.

12. The apparatus of claim 8, wherein the database row of data stored in the second database is updated using Structured Query Language (SQL) UPDATE statements, updating the database row of data stored in the second database based on entirety of the compared row of data.

13. The apparatus of claim 8, wherein the database row of data stored in the second database is updated using Application Programming Interface (API) functions of the on-line database, updating the database row of data stored in the second database based on entirety of the compared row of data.

14. The apparatus of claim 11, wherein a data entry in the first column of the database row of data stored in the second database is updated to match the data entry in the first column in the changed row of data in the first database only when the data entry in the first column in the compared row of data has the second flag.

15. A non-transitory computer-readable storage medium having embedded therein program instructions, when executed by one or more processors of a device, causes the device to execute an inter-database update process comprising:

storing a database row of data in a first database, a second database, and a third database, the database row of data having a plurality of data entries at a plurality of columns;

changing one or more data entries in the database row of data stored in the first database to generate a changed row of data stored in the first database, the changed row of data having a plurality of data entries at a plurality of columns;

comparing the changed row of data to the database row of data stored in the third database to generate a compared row of data, the compared row of data having a plurality of columns, each column of the compared row of data having a data entry that indicates whether a data entry in a corresponding column of the changed row of data and a data entry in a corresponding column of the database row of data stored in the third database are different; and in each column of the database row of data stored in the second database, updating a data entry in a column to match a data entry in a corresponding column in the changed row of data only when a data entry in a corresponding column of the compared row of data indicates a difference.

16. The non-transitory computer-readable storage medium of claim 15, wherein the first database is an off-line database and the second database is an on-line database.

17. The non-transitory computer-readable storage medium of claim 16, wherein generating the changed row of data includes:
receiving data by the off-line database from the on-line database; and
performing statistical analysis on the received data by the off-line database, the changed row of data being generated based on results of the statistical analysis.

18. The non-transitory computer-readable storage medium of claim 15, wherein a data entry in a first column of the compared row of data having a first flag when a data entry in a first column of the changed row of data and a data entry in a first column of the database row of data stored in the third database match, and a second flag when the data entry in the first column of the changed row of data and the data entry in the first column of the database row of data stored in the third database are different.

19. The non-transitory computer-readable storage medium of claim 15, wherein the database row of data stored in the second database is updated using Structured Query Language (SQL) UPDATE statements, updating the database row of data stored in the second database based on entirety of the compared row of data.

20. The non-transitory computer-readable storage medium of claim 15, wherein the database row of data stored in the second database is updated using Application Programming Interface (API) functions of an on-line database, updating the database row of data stored in the second database based on entirety of the compared row of data.

21. The non-transitory computer-readable storage medium of claim 18, wherein a data entry in the first column of the database row of data stored in the second database is updated to match the data entry in the first column of the changed row of data only when the data entry in the first column of the compared row of data has the second flag.

* * * * *